United States Patent Office 3,415,785
Patented Dec. 10, 1968

3,415,785
COPOLYMERIZATION OF TRIOXANE AND NORBORNADIENE WITH A PREPOLYMER CATALYST
Michael R. Tirpak, Mentor, Irving Rosen, Painesville, Richard M. Wilhjelm, Chagrin Falls, Ohio, and Jerry T. Reed, Houston, Tex., and Kornel D. Kiss, University Heights, Ohio, assignors to Diamond Shamrock Corporation, a corporation of Delaware
No Drawing. Filed June 7, 1965, Ser. No. 462,087
14 Claims. (Cl. 260—67)

ABSTRACT OF THE DISCLOSURE

Copolymers of trioxane and norbornadiene or a monoalkyl-substituted norbornadiene are prepared employing as the polymerization catalyst, a liquid oligomer of either norbornadiene or norbornadiene and trioxane in combination, which oligomer is formed by contacting the norbornadiene or the norbornadiene-trioxane mixture with a liquid coordination complex of a metal halide with an organic compound wherein oxygen, nitrogen or sulfur is the donor atom.

---

This invention relates to the preparation of thermoplastic compositions having a high degree of thermal stability. More particularly, it relates to improvements in the production of thermally stable oxymethylene copolymers whereby these compositions may be produced conveniently and economically in a continuous operation.

Copending application Ser. No. 449,271, filed Apr. 19, 1965, now U.S. Patent No. 3,344,120, Sept. 26, 1967 relates to a thermoplastic copolymer of excellent inherent thermal stability which is prepared from a mixture containing a major amount of trioxane and a minor amount of a norbornadiene monomer having the structural formula

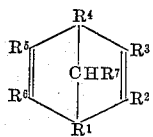

wherein $R^1$ to $R^7$ are each selected from the group consisting of hydrogen and lower alkyl radicals containing up to four carbon atoms with no more than one R being an alkyl radical.

As set forth in U.S. Patent No. 3,344,120, Sept. 26, 1967, this copolymer is prepared in a batch-type process wherein the above-described monomer mixture, optionally in the presence of a solvent or organic liquid reaction medium is contacted with a cationically-active catalyst in an inert atmosphere and substantially under anhydrous conditions, the said reaction being carried out at a temperature ranging generally from 30° to 100° C. for a time period of from 0.5 to 20 hours. The copolymer product obtained has good physical and chemical properties and may be processed by conventional methods into a variety of useful plastic articles. However, the process of U.S. Patent No. 3,344,120, Sept. 26, 1967 is characterized by a relatively long induction period, i.e., a period of time elapses after the monomeric ingredients are contacted with the catalyst before the start of the reaction as evidenced by the appearance of insoluble copolymer product in the reaction mixture. The induction period in the reaction, which also may be designated as the "initiation period" is generally from 20 to 40 minutes, or even longer. Additionally, the process of U.S. Patent No. 3,344,120, Sept. 26, 1967 primarily is useful for the production of laboratory or semi-commercial quantities.

It is an object of this invention, therefore, to provide a process whereby copolymers from trioxane and a norbornadiene monomer, as described above, may be prepared conveniently and economically in large quantities.

It is another object of this invention to provide a process which may be operated continuously for the preparation of copolymers from trioxane and the above-described norbornadiene monomer.

A still further object of this invention is to at least substantially reduce in a trioxane-norbornadiene copolymerization process as presently practiced, the time interval elapsing between the initial monomer-catalyst contact and the first appearance of solid copolymer product.

It is still another object of this invention to prepare, at one time, large quantities of copolymers in predominantly granular form from trioxane and the above-described norbornadiene monomer.

These and other objects are accomplished by employing as the catalyst or initiator for the copolymerization reaction a liquid, cationically-activated polymeric species which is formed prior to the reaction by contacting a cationic-type catalyst with either the norbornadiene monomer alone or in combination with trioxane. This initiator which is generally referred to herein as a "prepolymer catalyst" is believed to be essentially an activated oligomer of norbornadiene or of the trioxane-norbornadiene mixture. We have found that by using this prepolymer catalyst, the induction period in the reaction, as practiced heretofore, can be virtually eliminated and the desired copolymers accordingly may be prepared more quickly and economically. Most advantageously, by employing this prepolymer catalyst, the process as described in U.S. Patent No. 3,344,120, Sept. 26, 1967, may be conveniently adapted to a continuous method for the large-scale, commercial production of trioxane-norbornadiene copolymers.

As used herein in the specification and claims and as represented by the structural formula above, the term "norbornadiene monomer" refers to unsubstituted norbornadiene and to norbornadienes having only one lower alkyl group attached to the norbornadiene ring as, for example, those compounds substituted in the 2- and 4-positions of the norbornadiene ring such as 2-methyl norbornadiene or 4-methyl norbornadiene. However, because of its greater availability, unsubstituted norbornadiene is the presently preferred monomer for use in this invention and specific reference will be made hereinafter to this monomer. Such reference is not to be taken, however, as limiting the present invention but merely as being illustrative thereof.

As described previously, the prepolymer catalyst of this invention may be an activated oligomer of either norbornadiene monomer or of norbornadiene and trioxane in combination. For the sake of convenience, the oligomer from norbornadiene is referred to hereinafter as catalyst A, while that formed from the monomer combination is designated as catalyst B. The prepolymer catalyst generally may be prepared in an inert atmosphere and under substantially anhydrous conditions by contacting the monomer or monomer mixture with a cationically-active catalyst. During the reaction, the monomer-catalyst mixture which initially is a water-white solution progresses through a series of color changes ranging from orange to light brown. These color changes are presently believed to be visual indications of complexes formed between the norbornadiene and the catalyst and are especially pronounced when preparing catalyst A. In the preparation of catalyst B, the same color changes are observed in the monomer-catalyst mixture as the reaction progresses, but the finished activated oligomer generally is a light to medium tan color. In either instance, the finished prepolymer catalyst is a liquid substance which may vary widely in consistency depending particularly upon the monomer-to-catalyst ratio employed in its preparation. For example, a prepolymer catalyst prepared employing a lower catalyst-to-monomer ratio generally is a fairly fluid substance, while a catalyst prepared under the same reaction conditions but with a higher catalyst-to-monomer ratio may be an extremely viscous material of somewhat gummy consistency.

As mentioned previously, cationically-active catalysts are employed to prepare the prepolymer catalyst of this invention, being used preferably in concentrated, undiluted form. Suitable cationic catalysts are liquid coordination complexes of metal halides with organic compounds wherein nitrogen, sulfur or preferably oxygen is the donor atom. Suitable metal halides include those of aluminum, boron, tin, titanium, zirconium, strontium, niobium and the like with the halides of boron, e.g., boron trifluoride, being presently preferred. Suitable boron trifluoride complexes include, for example, a complex of boron trifluoride with an alcohol, a phenol, an acid, an ether, an acid anhydride, an ester, a ketone, an aldehyde, a dialkyl sulfide, a mercaptan and the like. Of these types, the boron trifluoride complexes with ethers such as diethyl ether, dibutyl ether and the like are especially preferred at present. The amount of cationic catalyst employed to prepare either type prepolymer catalyst is based on the quantity of norbornadiene monomer employed and this catalyst amount may range generally from 10 to 100 millimols for each mol of norbornadiene. Efficient prepolymer materials may be prepared within comparatively short reaction time periods by employing an amount of catalyst ranging from about 20 to 60 millimols per mol of norbornadiene, and this catalyst range accordingly is preferred. In the preparation of prepolymer catalyst B, it is to be noted that trioxane and norbornadiene are employed in combination. Using the same cationic catalyst range as described above, a ratio of from 1 to 5 mols of trioxane for each mol of norbornadiene generally may be employed to prepare this catalyst. However, satisfactory catalysts are prepared employing a ratio of from 1 to 2 mols of trioxane per mol of norbornadiene, and accordingly, these monomer ratios are preferred.

The prepolymer catalyst, whether type A or B, is preferably prepared in the absence of solvent or inert organic liquid reaction medium, since the use of such liquids appears to increase the reaction time period required to prepared the desired prepolymer catalysts. Stated in another manner, the use of a solvent or liquid reaction medium appears to increase the amount of catalyst required to prepare, within the same reaction time period, a prepolymer material similar in properties and catalytic efficiency to that prepared in the absence of solvent. However, if the prepolymer catalyst is extremely viscous as prepared, it may be dissolved in one or more suitable solvents or diluted with inert organic liquid reaction media to improve its flowability and handling characteristics. Organic liquids employed as solvents include chlorinated alkanes and alkenes such as, for example, 1,2-dichloroethane or trichloroethylene. Organic liquids employed as diluents include aliphatic and cycloaliphatic hydrocarbons such as hexane, heptane, cyclohexane and the like.

In one method of carrying out this invention, the prepolymer catalyst is prepared in a reactor such as a jacketed flask or a glass-lined polymerization kettle fitted with stirring apparatus. After preparation of the catalyst, either molten trioxane or a liquid mixture of trioxane and norbornadiene (and optionally, solvent) may be added thereto to effect the copolymerization. Alternatively, of course, the prepolymer catalyst may be added to either the trioxane or trioxane-norbornadiene mixture contained in a jacketed conventional reactor as described above or in a high-shear mixer. High-shear mixers which suitably may be employed as reactors herein include, for example, a Sigma mixer of the type manufactured by the Read Corporation; the "Ko-Kneader" described in U.S. Patent 2,505,125 and a Banbury mixer. If the copolymerization is carried out in a mixer wherein the copolymerization mixture can be subjected to continuous shearing and blending as copolymerization is effected, the copolymer product is obtained in predominantly granular form.

In another embodiment of this invention, the prepolymer catalyst is prepared initially in the high shear reactor. Thereafter, the trioxane or the trioxane-norbornadiene monomer mixture is added to the catalyst and copolymerization is completed in the mixer. The copolymer product obtained is in predominantly granular form.

After the monomeric materials are contacted with the prepolymer catalyst, optionally in the presence of solvent or inert organic liquid reaction medium, the copolymerization process may be completed in a reaction time of from five minutes to 5 hours, depending upon the copolymerization procedure and reaction temperatures employed. In general the reaction temperature may range from 30° to 100° C., with reaction temperatures of from 30° to 80° C. being preferred. However, as shown hereinafter by specific example, copolymerization is effected preferably in the absence of solvent or diluent since, as previously pointed out, a higher catalyst concentration is required to effect within the same time period copolymerization in the presence of such liquids compared to a copolymerization reaction in their absence. Accordingly, a process conducted in the absence of solvents offers an economic advantage in reduced catalyst requirements, in addition to eliminating provision for solvent recovery. The prepolymer catalyst also may be employed efficiently in a process wherein the trioxane and norbornadiene are copolymerized in the solid state, as described in a copending application filed of even date herewith in the names of Howard E. Everson, Kornel D. Kiss and Jerry T. Reed.

The prepolymer catalyst, whether type A or type B, generally may be prepared at a temperature ranging from 30° to 120° C. in from less than 5 minutes to 24 hours, depending upon the ratio of norbornadiene-to-catalyst present in the reaction mixture. Employing a mixture containing the preferred cationic catalyst concentration, i.e., from about 20 to 60 millimols of catalyst for each mol of norbornadiene, the prepolymer may be prepared in 5 to 60 minutes, at a temperature of from 50° to 80° C. After preparation, the prepolymer catalyst may be stored for several days at temperatures up to 70° C. without any loss in catalytic activity.

Trioxane-norbornadiene copolymer products may be prepared conveniently and economically in a continuous process by feeding the prepolymer catalyst at a prescribed rate into one end of a high shear mixer containing the trioxane or trioxane-norbornadiene mixture. Thereafter, copolymerization will progress in the resulting monomer-catalyst mixture as it is advanced through the high shear mixer, the copolymer product being recovered in granular form. A suitable high-shear mixer may be, for example, the "Ko-Kneader" which is described in U.S. Patent 2,505,125 or the "Twin-Screw Continuous Processor" manufactured by the Read Corporation. In one method of operation which is conducted in an inert atmosphere under substantially anhydrous conditions, the prepolymer catalyst may be prepared in large quantities and then stored in at least one jacketed container connected to one end of the high-shear mixer by means of a valved line. The trioxane or the monomeric mixture (and optionally, solvent) will be fed into the high shear mixer through an adduct line attached to the mixer at a point proximate to that carrying the prepolymer catalyst. At the beginning of the process, the monomeric materials (and optionally solvent) will be charged into the mixer and agitation started. The prepolymer catalyst will then be fed (by gravity flow or by forced feed) into the mixer at a prescribed rate. Thereafter, the monomeric mixture and the catalyst will each be added to the mixer in a prescribed ratio and at a prescribed rate, conversion in the resultant reaction mixture increasing as it is advanced through the mixer. After removal from the mixer, the particulate copolymer product may be passed through one or more washing tanks to remove any unreacted monomers, low molecular weight homopolymers or catalyst residues remaining or to remove any occluded solvent. Before packaging or processing, the copolymer product may be dried by passage through a drying apparatus maintained at 100° to 150° C. Additionally, if desired, it may be stabilized by chemical treatment or by incorporating stabilizing additives therewith.

The copolymer products prepared according to this invention generally contain from about 90 to about 99.9 mol percent of recurring oxymethylene units and from about 0.1 to 10 mol percent of recurring units derived from norbornadiene, as determined by elemental carbon-hydrogen analysis. The preferred copolymers contain from 95 to 99.7 mol percent of oxymethylene units and from about 0.3 to 5 mol percent of the said norbornadiene units. These copolymer products have an inherent viscosity of at least 0.7, which value is determined at 60° C., employing a solution containing 0.5 g. of the copolymer in 100 ml. of solution, the solvent being p-chlorophenol containing 2 percent of alpha-pinene, by weight. The preferred copolymers of this invention have an inherent viscosity of at least 1.0. These copolymers are tough and durable materials which may be fabricated into a variety of useful plastic articles by conventional processing methods as practiced at the present time. They are characterized by an inherent high degree of thermal stability. The thermal stability of these copolymers is measured in an inert atmosphere by well known thermogravimetric analytical techniques, using a Stanton automatic recording thermobalance. Throughout the test, the copolymer sample is maintained at a temperature of 220° C., the weight loss of the copolymer, i.e., its decomposition, and the time of the test in minutes being automatically recorded. After the heat treatment, the decomposition rate of the copolymer is obtained by plotting the logarithm of the weight percent of the remaining undegraded copolymer versus the corresponding time of oven exposure. A curve drawn through the plotted values indicates that after rather rapid degradation initially, the copolymer degrades at a much slower and even rate throughout the major portion of the degradation period, which slower rate characterizes the true stable nature of the copolymer. Therefore, the reaction rate constant for thermal degradation of the copolymer is selected from this latter portion of the degradation curve and is expressed as weight percent per minute.

In order that those skilled in the art may more completely understand the present invention, and the preferred methods by which the same may be carried into effect, the following specific examples may be offered.

EXAMPLE 1

A sample vial is dried, purged with nitrogen and sealed with a serum cap. By means of a hypodermic syringe, 2.03 ml. of norbornadiene and then 0.06 ml. of boron trifluoride dibutyl etherate catalyst are injected into the vial at room temperature. The resulting mixture is allowed to stand for 40 minutes. A 100-ml. resin flask fitted with an agitator, a thermocouple, a serum cap for injection of ingredients and with inlet and outlet lines for passage of nitrogen, is positioned in an oil bath. It is purged with nitrogen while being heated to 75° C. 51.70 ml. of molten trioxane is then charged to the flask, agitation is started, and the aged norbornadiene prepolymer catalyst is added. The catalyst level in the total reaction mixture is 18.6 millimols of catalyst per mol of norbornadiene. The reaction mixture immediately becomes cloudy with insoluble copolymer product. The reaction is continued with agitation for 90 minutes, while controlling the reaction temperature at 76° to 78° C. During this time period, the reaction mixture becomes increasingly viscous until it is a solid mass. This product is recovered from the reactor and is pulverized in acetone. The particulate product obtained is repeatedly washed with hot water and is finally dried at 50° C. under vacuum. The finished copolymer has an inherent viscosity of 0.82. This product has a reaction rate constant for thermal degradation at 220° C. of 0.05 weight percent per minute.

EXAMPLE 2

Following the general procedure as outlined in Example 1, a trioxane-norbornadiene copolymer is prepared in the presence of solvent, employing a norbornadiene prepolymer catalyst. The catalyst is prepared by mixing together at room temperature, 1.7 ml. of norbornadiene and 0.03 ml. of boron trifluoride dibutyl etherate catalyst. The resulting mixture is then allowed to stand for 15 minutes. A 100-ml. resin flask equipped as described in Example 1 is purged with nitrogen and heated to 60° C. 57.6 ml. of molten trioxane and 18 ml. of cyclohexane are then charged to the flask, agitation is started and the prepared norbornadiene prepolymer catalyst is added. The catalyst level in the total reaction mixture is 11 millimols per mol of norbornadiene. The reaction is continued for 20 hours while maintaining the reaction flask in a bath heated to 60° to 63° C. At the end of this time period, the reaction product is a solid mass. This product is pulverized, purified and dried as described in Example 1. The finished copolymer has an inherent viscosity of 0.73.

EXAMPLE 3

A prepolymer catalyst is prepared in an inert atmosphere under substantially anhydrous conditions by reacting for 25 minutes in a 100-ml. resin flask maintained at 62° C., 1.8 g. of trioxane, 0.92 g. of norbornadiene and 0.108 g. of boron trifluoride dibutyl etherate. At the end of the reaction period, the prepolymer catalyst is relatively viscous and is diluted with 12 ml. of cyclohexane. 31.0 g. of molten trioxane is then injected into the flask and mixed with the catalyst and solvent. The catalyst level in the total reaction mixture of this example is 54 millimols per mol of norbornadiene. Insoluble copolymer appears immediately in the reaction mixture. While continuing to maintain a positive nitrogen pressure on the system, the copolymerization reaction is continued for 90 minutes, while the temperature of the reaction mixture is maintained at 61° to 67° C. The product is removed from the flask, ground under acetone, and then purified and dried as described in Example 1. The finished copolymer which contains 1.2 mol percent of units derived from norbornadiene has an inherent viscosity of 1.49. It has a reaction rate constant for thermal degradation at 220° C. of 0.13 weight percent per minute, 77 percent of the copolymer remaining stable after being exposed one hour at 220° C. under nitrogen.

EXAMPLE 4

A copolymerization process is carried out following the general procedure as outlined in Example 3. In this example, the prepolymer catalyst is prepared at 55° C. in 3 mls. of trichloroethylene solvent. 0.9 g. of trioxane, 0.92 g. norbornadiene and 0.108 g. of boron trifluoride dibutyl etherate are employed, and the reaction time is 1 hour. After preparation of the catalyst, 31.8 g. of molten trioxane is added to the reaction flask and insoluble copolymer formation is quickly observed in the reaction mixture. The reaction is continued for 2 hours while maintaining the reaction temperature at 54° to 59° C. At the end of the reaction period, the copolymer product is removed from the flask and is pulverized, purified and dried as described previously. The finished copolymer, which is recovered in 75.9 percent yield, has an inherent viscosity of 0.87. It exhibits a reaction rate constant for thermal degradation at 220° C. of 0.06 weight percent per minute, being 82 percent stable to exposure under nitrogen at this temperature for 1 hour.

EXAMPLE 5

In this example, a trioxane-norbornadiene copolymer is prepared entirely in the absence of solvent, while maintaining the reaction mixture in the solid state. A prepolymer catalyst is prepared in an inert atmosphere and substantially under anhydrous conditions by mixing together for 5 minutes in a 100-ml. jacketed flask maintained at 65° C., 21 ml. of trioxane, 15.7 ml. of norbornadiene and 1.15 ml. of the boron trifluoride dibutyl etherate catalyst. The resulting liquid monomer-catalyst complex is charged via a stopcock into a jacketed Sigma mixer containing an agitated mixture of 534 ml. of trioxane and 6.7 ml. of norbornadiene. The catalyst level in the total reaction mixture is 32.1 millimols for each mol of norbornadiene. While continuing to maintain a slight positive nitrogen pressure on the system, the agitated reaction mixture is cooled to 36° C. and is then maintained at this temperature while solidification and pulverization of the mixture is effected, the total cooling time being 70 minutes. The solidified, particulate reaction mixture is then warmed to at least 52° C. and maintained at this temperature while continuously being blended. The total heating period is 50 minutes, while the total time of the reaction is slightly over 2 hours. The copolymer product which is recovered in 84 percent yield is purified and dried as previously described. This copolymer has an inherent viscosity of 1.17. It has a reaction rate constant for thermal degradation at 220° C. of 0.08 weight percent per minute, 72 percent of the copolymer remaining stable after the initial degradation has been completed.

EXAMPLE 6

A jacketed one-liter flask equipped with an agitator, a thermometer and inlet and outlet tubes for passage of nitrogen is connected to one end of the jacketed Sigma mixer used in Example 5. Four-hundred twenty-five ml. of molten trioxane is charged to the flask and maintained at 65° C. A prepolymer catalyst is prepared at 63° to 65° C. in an inert atmosphere by charging into the Sigma mixer 25 ml. of trioxane, 18 ml. of norbornadiene and 1.4 ml. of boron trifluoride dibutyl etherate catalyst which has been diluted with 13.6 ml. of cyclohexane. The catalyst concentration is 48.6 millimols per mol of norbornadiene. After being reacted for 2 hours, 96 additional ml. of cyclohexane is added to the prepolymer and mixed therewith for 5 minutes. The trioxane is then transferred from the flask via a stopcock into the Sigma mixer. While continuing to maintain a slight positive nitrogen pressure on the system, the resulting trioxane-prepolymer catalyst mixture is maintained at 55° to 60° C. for an additional 3 hours, while continuously being subjected to shearing and blending. During this time period, the consistency of the reaction mixture gradually changes from a slurry to a dry, predominantly granular material. The particulate product is removed from the mixer, washed successively with acetone, hot water and acetone and is finally dried at 50° C. under vacuum. The finished copolymer which is recovered in 82 percent yield has an inherent viscosity of 0.84. Its thermal stability characteristics are similar to those of the product of Example 4.

It is to be understood that although the invention has been described with specific reference to particular embodiments thereof, it is not to be so limited, since changes and alterations therein may be made which are within the full intended scope of this invention as defined by the appended claims.

What is claimed is:

1. A process for preparing a linear, thermally stable copolymer composition from trioxane and a norbornadiene monomer having the structure

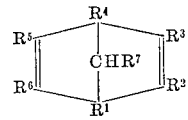

wherein $R^1$ to $R^7$ are each selected from the group consisting of hydrogen and lower alkyl radicals containing up to four carbon atoms with no more than one R being an alkyl radical, which process comprises first reacting in an inert atmosphere, under substantially anhydrous conditions and optionally in the presence of a liquid aliphatic or cycloaliphatic hydrocarbon diluent, the norbornadiene monomer or a mixture containing from 1 to 5 mols of trioxane per mol of said norbornadiene with a cationic-type catalyst which is a liquid coordination complex of a halide of aluminum, boron, tin, titanium, zirconium, strontium or niobium with an organic compound wherein oxygen, nitrogen or sulfur is the donor atom, to form a liquid activated oligomer containing norbornadiene units in an amount which is at least excessive of 10 mol percent of said oligomer, by weight; thereafter adding to the activated oligomer and polymerizing a sufficient quantity of trioxane to yield, upon completion of the polymerization reaction, a copolymer composition consisting essentially of from 90 to 99.9 mol percent of recurring oxymethylene units interspersed with from 0.1 to 10 mol percent of recurring units derived from the norbornadiene monomer.

2. The process of claim 1 in which the activated oligomer is reacted with the additional trioxane in an inert atmosphere, under substantially anhydrous conditions, at a temperature ranging from 30° to 100° C. and in a time period of from 5 minutes to 5 hours.

3. The process of claim 1 in which the liquid activated oligomer is formed by contacting a cationic-type catalyst with norbornadiene monomer solely at a temperature ranging from 30° to 120° C. and for a time period of from less than 5 minutes to 24 hours, the catalyst concentration employed being from 10 to 100 millimoles for each mol of norbornadiene.

4. The process of claim 3 in which the liquid norbornadiene oligomer is prepared in the presence of cyclohexane as the inert organic liquid diluent.

5. The process of claim 4 in which the cationic-type catalyst employed is a coordinate complex of boron trifluoride with a lower alkyl ether.

6. The process of claim 4 in which catalyst is employed at a concentration ranging from about 20 to 60 millimols per mol of norbornadiene and the activated norbornadiene oligomer is prepared in a time period of from 5 to 60 minutes at a temperature of from 50° to 80° C.

7. The process of claim 1 in which the activated oligomer employed is formed at a temperature ranging from 30° to 120° C. and in a time period of less than 5 minutes to 24 hours by contacting the said cationic-type catalyst with a mixture containing from 1 to 5 mols of trioxane for for each mol of norbornadiene, the catalyst concentration employed being from 10 to 100 millimols per mol of norbornadiene.

8. The process of claim 7 in which the cationic-type catalyst employed is a coordinate complex of boron trifluoride with a lower alkyl ether.

9. The process of claim 7 in which the cationic catalyst is employed at a concentration ranging from about 20 to 60 millimols per mol of norbornadiene and the activated norbornadiene-trioxane oligomer is prepared in a time period of from 5 to 60 minutes at a temperature ranging from 50° to 80° C.

10. The process of claim 9 in which the monomeric mixture employed contains from 1 to 2 mols of trioxane for each mol of norbornadiene.

11. The process of claim 1 which is conducted in a high shear reactor and the copolymer product is recovered in predominately granular form.

12. The process of claim 11 which is conducted continuously.

13. The process of claim 1 in which the norbornadiene monomer employed is unsubstituted norbornadiene.

14. The process of claim 1 in which the norbornadiene monomer employed is 2-methyl norbornadiene.

References Cited

UNITED STATES PATENTS

| 3,344,120 | 9/1967 | Rosen | 260—73 |
| 3,272,778 | 9/1966 | Ishida | 260—67 |

WILLIAM H. SHORT, *Primary Examiner*.

L. M. PHYNES, *Assistant Examiner*.

U.S. Cl. X.R.

252—426.